Jan. 7, 1969 E. G. BUSTOS 3,421,144
COMBINATION LOW TIRE PRESSURE INDICATOR AND
WHEEL BALANCING DEVICE
Filed Oct. 11, 1965 Sheet 2 of 2

Epifanio G. Bustos
INVENTOR.

and is spaced therefrom by the insulating member 54.
Thus, it will be apparent that the contact 46 is in constant
United States Patent Office 3,421,144
Patented Jan. 7, 1969

3,421,144
COMBINATION LOW TIRE PRESSURE INDICATOR AND WHEEL BALANCING DEVICE
Epifanio G. Bustos, Sapello, N. Mex., assignor of fifty percent to Lily Jaramillo, Mora, N. Mex.
Filed Oct. 11, 1965, Ser. No. 494,515
U.S. Cl. 340—58                                 8 Claims
Int. Cl. B60c 23/04

ABSTRACT OF THE DISCLOSURE

An attachment for a vehicle wheel including an enclosed chamber positioned on the associated wheel and including means operative to oppose imbalance of the wheel and adapted to have air disposed therein under pressure slightly lower than the air pressure within the associated tire, the attachment also including pressure differential actuated switch means in fluid transfer relation with said chamber and tire and operative, in response to a reduction of air pressure in said tire, to less than the pressure in said chamber, to actuate an associated electrical signal circuit.

---

The present invention relates generally to a tire pressure indicator and wheel balancing device and more particularly to means for use with the pneumatic tires of a motor vehicle or the like to indicate by visual indication means the condition of under-inflation of the tires, the means also relating to an automatic wheel balancer for vehicles.

It is an object of the present invention to provide a novel and improved low tire pressure indicator in combination with means for automatically balancing the wheels of a motor vehicle.

It is another object of the present invention to provide wheel balancing means which operates automatically as the vehicle is in motion due to centrifugal force.

It is a still further object of the present invention to provide novel pressure differential responsive valve means which is mounted on a vehicle wheel and connected to the tire including pressure differential actuated switch means adapted to close a circuit to one of a plurality of lamps positioned within the vehicle driver compartment.

It is a still further object of the present invention to provide a novel combination comprising a low tire pressure indicator system and wheel balancing system which is easily fabricated of readily available materials, includes a minimum of moving parts and which can be easily and quickly attached to vehicle wheels.

It is a final object of the present invention to provide a novel pressure responsive valve which is extremely sensitive to variations in air pressure differentials between an air reservoir and a vehicle tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a partial enlarged vertical sectional view through a self-adjusting brush employed in the present invention.

Figure 1:
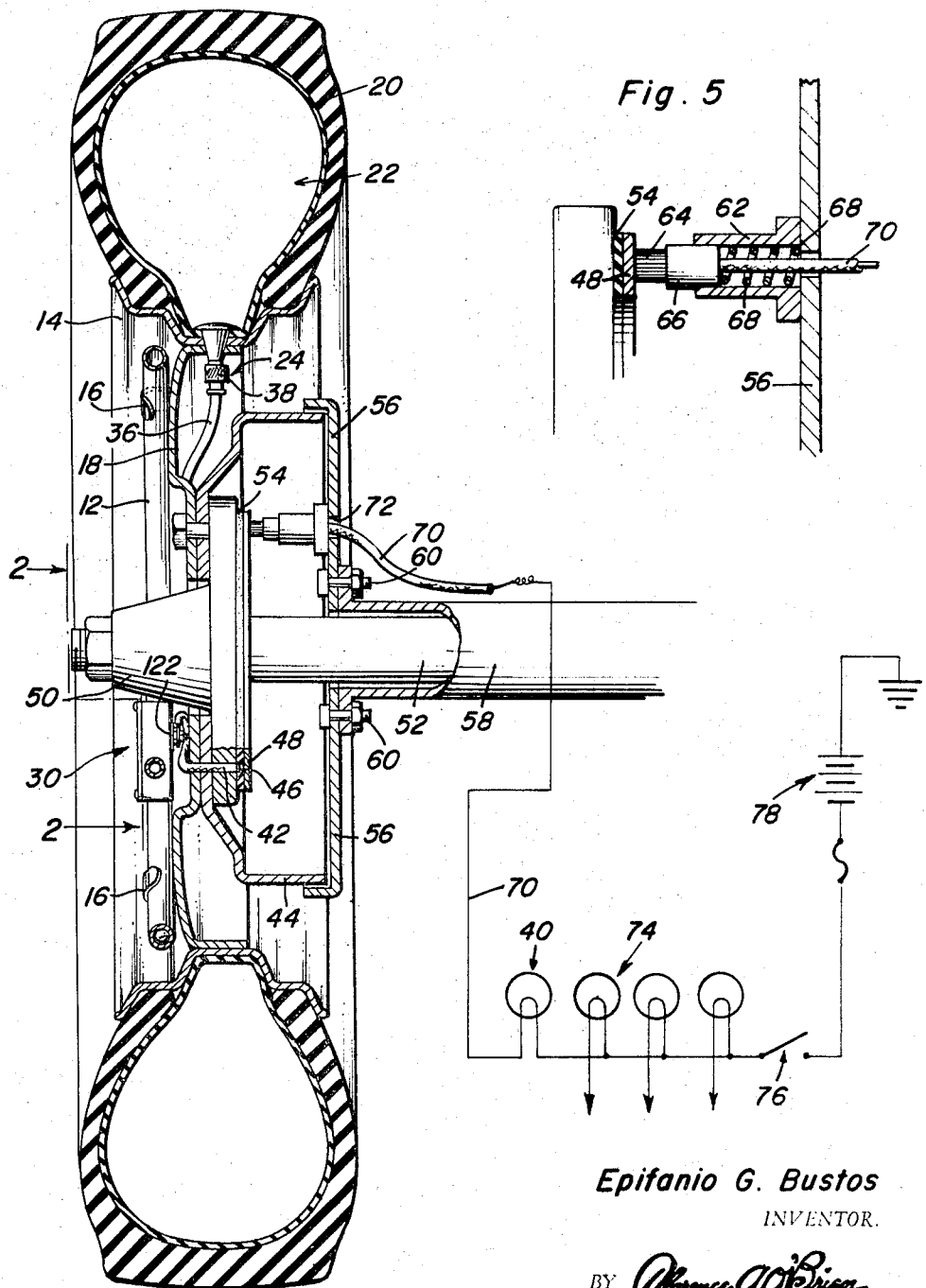
FIGURE 1 is a vertical sectional view of a vehicle wheel includnig the combination low tire pressure indicator and wheel balancing device of the present invention mounted in place thereon and having the electrical circuit used with the present invention schematically illustrated.

Referring now to the drawings in greater detail, reference numeral 10 generally denotes the combination low tire pressure indicator and wheel balancing device of the present invention. The device comprises an annular tubular air reservoir chamber 12 which is mounted on a conventional vehicle wheel 14 by a plurality of spring mounting clips 16. The spring mounting clips 16 are preferably fabricated of resilient spring-like material which may be sprung outwardly to receive the tubular air reservoir 12 and then released whereby the clips will hold the reservoir 12 tightly against the rim portion 18 of wheel 14. The wheel 14 further includes thereon a conventional pneumatic tire 20 including air chamber 22 therein, the tire having a conventional valve such as a Schrader valve generally denoted by reference numeral 24 in communication with chamber 22. The valve 24 conventionally extends through wheel 14 and rim 18 to provide ready access for pressured air filling devices.

The tubular air reservoir member 12 includes first and second tubular arm members 26 and 28. Arm 28 communicates at one end with the air reservoir 12 and at the other end with the interior of an air equalizer switch generally denoted by reference numeral 30. The tubular arm 26 is closed to reservoir 12 and includes an extension arm 32 thereon, the arm 32 receiving on the end thereof a threaded connector 34 having a hose 36 attached thereto. The other end of the hose 36 includes a conventional threaded nipple member 38 thereon which is conventionally adapted to be received on the valve 24 for air fluid communication with tire 20. Thus, it will be readily observed by viewing FIGURES 1 and 4 that the air equalizer switch 30 communicates at one end through tubular arm 26, extension arm 32 and hose 36 with the chamber 22 of tire 20 and at the other end through tubular arm 28 with the air reservoir 12.

It is deemed expedient at this point in the description of the invention to describe the total operation of the low tire pressure indicator device. The hose 36 and arm 26 which communicate with the tire and the arm 28 which communicates with the reservoir allow the air pressure of the tire and reservoir respectively to be transmitted to the air equalizer switch 30. The chamber 22 of tire 20 normally contains air at a higher pressure than the air in the reservoir 12 and, by means to be described more fully below, as this condition of air pressure differential exists, the indicator is rendered inoperative. However, if the pressure in the tire falls below that in the reservoir, as for example due to a leak in the tire, the above-mentioned means will cause the circuit to become operative and an indicator lamp such as lamp 40 will be turned on in the vehicle driver's compartment thus drawing the driver's attention to the low tire pressure condition in one of the tires.

Figure 4:
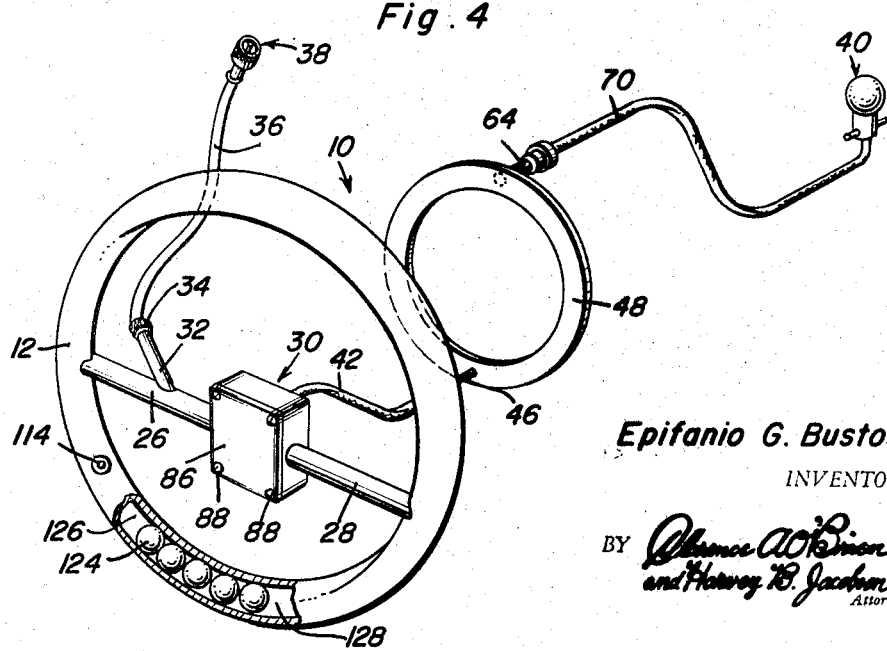
FIGURE 4 is a perspective view with parts broken away of the various elements of the device comprising the present invention.

Referring to FIGURES 1, 4 and 5, for a description of the electrical operation of the invention, it will be observed that electrical wires 42 lead from the air equalizer switch 30 through the rim 18 and the brake drum 44 and include an electrical contact end portion 46. The contact 46 is mounted for engagement with an annular contact ring 48 of conventional electrical conductive material, such as copper or copper alloy. The contact ring 48 is mounted for rotation with the hub section 50 and brake drum 44 upon the vehicle axle 52. The contact ring 48 is mounted within the drum in any conventional manner and is spaced therefrom by the insulating member 54. Thus, it will be apparent that the contact 46 is in constant engagement with the contact ring 48. The drum 44 includes a cover plate 56 which is mounted fixedly to the axle housing 58 and therefore stationary. The cover plate 56 is fastened to the housing 58 by the bolts 60. Mounted on the cover plate 56 is an insulated carbon brush housing 62 having fitted therein a self-adjustable carbon brush 64 for contact with the ring 48. The brush 64 is mounted in brush carrier 56 and is urged against the ring 48 by a spring 68 contained within the housing 62. An electrical lead wire 70 is in contact with the brush 64 and extends outwardly through an opening 72 in cover plate 56. Referring to FIGURE 1, it will be observed that the lead 70 extends to lamp 40 which is one of a plurality of indicator lamps generally denoted by reference numeral 74. The indicator lamps 74 are then connected through ignition switch 76 to the vehicle battery 78. Of course, it will be appreciated that the indicator lamps are mounted in the vehicle's driver compartment and preferably on the dashboard, and each lamp is connected to an air equalizing switch such as switch 30 mounted on one of the four vehicle wheels. Thus, the indicator lamps provide means for indicating a low tire pressure condition in each of the vehicle tires individually.

Figure 2:
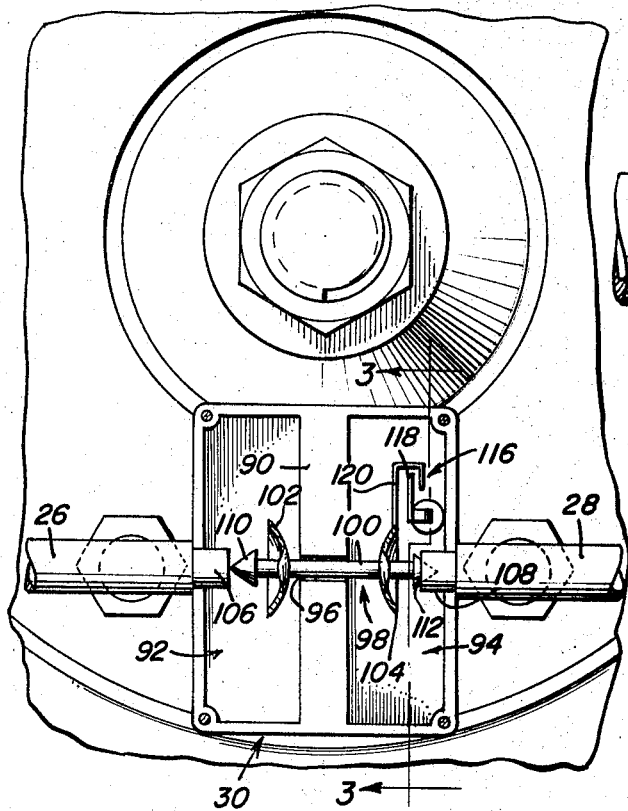
FIGURE 2 is an enlarged partial elevational view taken substantially on the plane of the line 2—2 of FIGURE 1.
Figure 3:
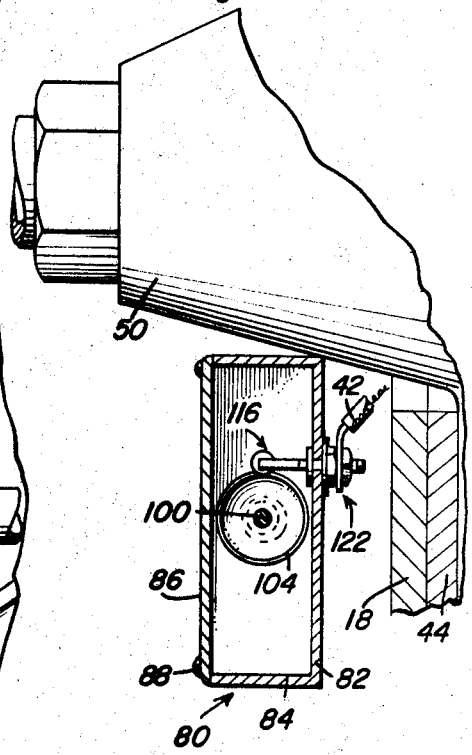
FIGURE 3 is a partial vertical sectional view taken substantially upon the plane of the line 3—3 of FIGURE 2.

Referring now to FIGURES 2 and 3 for a more detailed description of the air equalizer switch 30, it will be observed that the switch includes a housing generally denoted by reference numeral 80 having a back wall 82, side walls 84 and a detachable or removable cover 86. The cover 86 is mounted on the housing 80 by conventional screws 88. A centrally mounted dividing wall 90 is included in the housing and divides the housing into substantially equal chambers 92 and 94.

The dividing wall 90 includes a centrally oriented opening 96 therein. Positioned in the opening 96 and extending at the chambers 92 and 94 is the umbrella switch denoted by numeral 98, including an elongated stem portion 100 which extends through the opening 96. Mounted on each end of the stem 100 in chambers 92 and 94 respectively, are a pair of umbrella-like fins 102 and 104, which fins are concave portions integrally formed on stem 100. The side walls of the housing 80 have conventional threaded openings therein (not illustrated) for receiving the arms 26 and 28. Mounted in the openings are a pair of valve seats 106 and 108 which communicate with the arms 26 and 28, respectively. The valve seats 106 and 108 include end portions having a tapered seat (not illustrated) therein and the stem 100 includes tapered seating members 110 and 112 thereon for airtight seating in the aforementioned seats. Thus, it will be appreciated that when the reservoir 12 is mounted on the wheel by the mounting clips 16 and the hose 36 connected to the tire 20, the air pressure in the tire will be communicated through arm 26 to the chamber 92.

The reservoir 12 is filled through conventional valve 114 in a wall thereof, the valve 114 being substantially similar to those in use on footballs or basketballs or the like. As mentioned above, the reservoir 12 will be filled with air through valve 114 to a pressure less than that contained in the tire 20. Thus, the pressure communicated to chamber 92 through arm 96 will force the valve member 98 to the position shown in FIGURE 2 as the air forces seating member 110 out of the valve seat and catches in umbrella fin 102. The concave dish-like shape of fin 102 will catch the air rushing into the chamber 92 and rapidly force the stem 100 through opening 96 and force the seating member 112 into the seat 108. At this time, the tire equalizer switch 30 will contain air under pressure equal to the pressure in the tire 20, and the electrical switch generally denoted by reference numeral 116 will be opened thus rendering the electrical circuit open and the indicator lamp 40 in an unlighted condition.

The switch 116 includes one arm 118 mounted on the back wall 82 of housing 80 and another arm 120 mounted on the umbrella fin 104. Thus, by viewing FIGURE 2 it will be appreciated that if the air pressure in tire 20 were to fall below that in reservoir 12 and tubular arm 28, the pressure in the air equalizer switch 30 would also fall and the pressure differential between the air in arm 28 and equalizer switch 30 would cause the seating member 112 to be forced out of its seat. The fin 104 would then catch the air escaping in the chamber 94 and the seating member 110 would be rapidly forced into its seat. At the same time, the switch 116 would be closed by arm 120 moving into contact with arm 118. Thus, the circuit to indicator lamp 40 would be completed and indicator lamp 40 lighted, thereby providing an indication that the air pressure in tire 20 had fallen. The electrical wire 42 is connected to the arm 118 as indicated by reference numeral 122 and the switch 116 is connected to ground in a conventional manner.

In view of the foregoing description, it will be appreciated that the low tire pressure indicator portion of the present invention provides a means for indicating low pressure conditions in a vehicle tire. The tubular air reservoir member is preferably fabricated of plastic material or other lightweight rigid material, the annular compact ring is preferably copper or other conductive material and the stem 100 and fins 102 and 104 are preferably of lightweight plastic-type material.

Referring now to FIGURE 4, it will be observed that the annular tubular air reservoir 12 has a plurality of steel balls 124 in the interior cavity 126 formed therein. The size of tubular air reservoir 12 and thus the quantity of steel balls 124 placed therein would of course vary with the size of the vehicle wheel. Also included in the cavity 126 is a quantity of powdered graphite, mineral oil or other suitable lubricant which will enable the balls to move freely within the cavity 126. Thus, it will be appreciated that as the wheel rotates, the balls will move in the chamber 126 and due to centrifugal force, will eventually be easily distributed along that portion of the chamber which is diametrically opposite a heavy portion of the tire or wheel, thus achieving dynamic balance of the tire and wheel. At this time, the wheel will be balanced. Of course, each time the vehicle is stopped, the balls will gravitate toward the bottom of the tubular air reservoir of the chamber 126 and the cycle will be repeated when the vehicle is again put in motion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle wheel having a pneumatic tire mounted thereon, signalling means for signalling air pressure changes in said tire, said means including a tubular air container in the form of an annulus, said container mounted generally concentrically on the vehicle wheel, a plurality of weight means freely movable in said annulus, said weight means being disposed in said annulus for movement to positions in balanced opposition to weight irregularities in the wheel by centrifugal force when said vehicle is in motion whereby said tubular container serves the dual purpose of providing an air reservoir for said signalling means and a device for balancing the vehicle tires.

2. The combination of claim 1 wherein said signalling means further includes air pressure differential actuated switch means carried by said tubular annular air container and including contacts adapted to be disposed in an electrical signal circuit, means for communicating said switch means with said air container, means for communicating said switch means with the vehicle pneumatic tire, said switch means including means responsive to a change in differential air pressure between the container and the tire for shifting said contacts into and out of electrical contact with each other.

3. The combination of claim 2 wherein said switch means includes a substantially airtight enclosure, each said communicating means being connected to an opposite side of said enclosure, the connections of said communicating means to said container comprising first and second valve openings, said enclosure having means movable therein for selectively closing either said first or second valve openings in response to a change in differential air pressure between the container and the tire.

4. The combination of claim 3 including normally open electrical switch means in said enclosure, and means carried by said closing means for selectively opening and closing said electrical switch means.

5. The combination of claim 1 wherein said signalling means further includes air pressure differential actuated switch means carried by said tubular annular air container and including contacts adapted to be disposed in an electrical signal circuit, means for communicating said switch means with said air container, means for communicating said switch means with the vehicle pneumatic tire, said switch means including means responsive to a reduction of air pressure in said tire below the pressure of air in said container for actuating said switch means, said air container including air valve means operable to admit air under pressure into said air container and for bleeding air from the interior of said air container.

6. The combination of claim 5 wherein said switch means includes a substantially airtight enclosure, each of said communicating means being connected to an opposite side of said enclosure, the connections of said communicating means to said container comprising first and second valve openings, said enclosure having means movable therein for selectively closing either said first or second valve openings in response to a change in differential air pressure between the container and the tire.

7. In combination, a vehicle wheel having a pneumatic tire mounted thereon, signalling means for signalling air pressure changes in said tire, said means including an air container mounted on said wheel and including means adapted to oppose inherent imbalance of said wheel and tire and pressure differential actuated switch means carried by said air container including contacts adapted to be disposed in an electrical signal circuit, means for communicating said switch means with said air container, means for communicating said switch means with the vehicle pneumatic tire, said switch means including means responsive to a reduction of air pressure in said tire below the pressure of air in said container for actuating said switch means, said air container including valve means whereby air under pressure may be forced thereinto or bled therefrom.

8. The combination of claim 7 wherein said switch means includes a substantially fluid-tight enclosure, said tire and said container being disposed in fluid transmitting communication with said enclosure, means movably mounted in said enclosure for response to the differential fluid pressure of said tire and container, the last-mentioned means taking a first position when the pressure is higher in the container and a second position when the pressure is higher in the tire, an electrical switch mounted in said enclosure, and means carried by said responsive means for selectively opening and closing said electrical switch when said responsive means is in said first and second positions.

No references cited.

JOHN W. CALDWELL, *Primary Examiner.*

ALVIN H. WARING, *Assistant Examiner.*

U.S. Cl. X.R.

73—146.5; 200—61.25